US012064028B2

(12) United States Patent
Kayser

(10) Patent No.: US 12,064,028 B2
(45) Date of Patent: Aug. 20, 2024

(54) METHOD OF MAKING COMPOSITE HEAD SAFETY TOOTHBRUSH

(71) Applicant: Steven L. Kayser, Ferndale, WA (US)

(72) Inventor: Steven L. Kayser, Ferndale, WA (US)

(73) Assignee: Loops, LLC, Ferndale, WA (US)

( * ) Notice: Subject to any disclaimer, the term of this patent is extended or adjusted under 35 U.S.C. 154(b) by 485 days.

(21) Appl. No.: 17/327,734

(22) Filed: May 23, 2021

(65) Prior Publication Data

US 2021/0274927 A1 Sep. 9, 2021

Related U.S. Application Data

(63) Continuation-in-part of application No. 16/459,341, filed on Jul. 1, 2019, now Pat. No. 11,013,311, which is a continuation-in-part of application No. 15/854,097, filed on Dec. 26, 2017, now Pat. No. 10,334,940, which is a continuation-in-part of application No. 14/099,637, filed on Dec. 6, 2013, now abandoned, which is a continuation-in-part of application No. 11/653,153, filed on Jan. 12, 2007, now Pat. No. 9,066,583, which is a continuation-in-part of application No. 29/275,027, filed on Dec. 8, 2006, now Pat. No. Des. 601,805, which is a continuation-in-part of application No.

(Continued)

(51) Int. Cl.
*A46D 3/00* (2006.01)
*A46B 5/00* (2006.01)
*A46B 5/02* (2006.01)
*A46B 9/04* (2006.01)
*B29C 45/17* (2006.01)

(52) U.S. Cl.
CPC .............. *A46D 3/00* (2013.01); *A46B 5/0066* (2013.01); *A46B 5/02* (2013.01); *A46B 9/04* (2013.01); *A46D 3/005* (2013.01); *B29C 45/17* (2013.01); *A46B 2200/1066* (2013.01)

(58) Field of Classification Search
CPC ........ A46D 3/005; A46B 5/02; A46B 5/0066; A46B 5/0075; B29C 45/17
See application file for complete search history.

(56) References Cited

U.S. PATENT DOCUMENTS

| 1,645,965 A | 10/1927 | Neumerkel |
| 1,717,125 A | 6/1929 | Spitz |
| 1,908,510 A | 5/1933 | Dodson |

(Continued)

FOREIGN PATENT DOCUMENTS

| DE | 3628722 | 8/1986 |
| DE | 19624962 | 1/1998 |

(Continued)

*Primary Examiner* — Randall E Chin
(74) *Attorney, Agent, or Firm* — Timothy W. Fitzwilliam

(57) ABSTRACT

A composite safety toothbrush is disclosed, and in particular, methods for making and forming the composite. The toothbrush apparatus detailed herein employs a composite head made from a rigid inner polymer material and a softer thermoplastic material surrounding the inner material. The softer material provides safety for prison toothbrush applications as well as elderly and patient care where care givers may brush the teeth of a patient. Innovative pin connectors in the inner toothbrush head assist in the composite formation. The toothbrush solution herein further importantly provides for a toothbrush having a flexible handle, also providing safety in a prison environment.

15 Claims, 4 Drawing Sheets

Related U.S. Application Data

11/563,671, filed on Nov. 27, 2006, now Pat. No. 8,448,285.

(56) References Cited

U.S. PATENT DOCUMENTS

| | | | |
|---|---|---|---|
| 1,945,559 A | 2/1934 | McNally |
| 2,414,775 A | 9/1945 | Stavely |
| 4,020,521 A | 5/1977 | Valesquez |
| 5,272,784 A | 12/1993 | Levin |
| 5,291,878 A | 3/1994 | Lombardo et al. |
| D359,623 S | 6/1995 | Kinoshita |
| 5,609,890 A | 3/1997 | Boucherie |
| 5,628,082 A | 5/1997 | Moskovich |
| 5,630,244 A | 5/1997 | Chang |
| 5,864,915 A | 2/1999 | Ra |
| 6,004,059 A | 12/1999 | Zaccaria |
| D421,184 S | 2/2000 | Koh |
| D421,843 S | 3/2000 | Joergensen |
| 6,276,020 B1 | 8/2001 | Leversby et al. |
| 6,295,686 B1 | 10/2001 | Phillips |
| 6,298,516 B1 | 10/2001 | Beals et al. |
| 6,546,583 B1 | 4/2003 | Rohrig |
| 6,668,416 B1 | 12/2003 | Georgi et al. |
| 7,334,286 B2 | 2/2008 | Kayser |
| 2001/0013152 A1 | 8/2001 | Meyer et al. |
| 2002/0182282 A1 | 12/2002 | Lanvers |
| 2003/0208870 A1 | 6/2003 | Jimenez |
| 2003/0125224 A1 | 8/2003 | Fischer et al. |
| 2012/0324664 A1 | 12/2012 | Carpenter |

FOREIGN PATENT DOCUMENTS

| | | |
|---|---|---|
| EP | 89303135.1 | 3/1988 |
| EP | 033661 | 11/1989 |
| FR | 2226133 | 11/1974 |
| JP | 2002075889 | 3/2002 |
| WO | 00/15077 | 3/2000 |
| WO | 000022377 | 2/2001 |
| WO | 01/29128 | 4/2001 |

METHOD OF MAKING COMPOSITE HEAD SAFETY TOOTHBRUSH

PRIORITY CLAIM

This patent application is a continuation-in-part, and therefore contains subject matter claiming benefit of the priority date of pending U.S. patent application Ser. No. 16/459,341, filed on Jul. 1, 2019, entitled COMPOSITE HEAD TOOTHBRUSH HAVING SAFETY FEATURES AND METHODS OF MAKING SAME, now to be U.S. Pat. No. 11,013,311, which is a continuation-in-part of U.S. patent application Ser. No. 15/854,097, filed on Dec. 26, 2017 entitled COMPOSITE HEAD TOOTHBRUSH HAVING SAFETY FEATURES, now U.S. Pat. No. 10,334,940, which is a continuation-in-part of U.S. patent application Ser. No. 14/099,637 filed on Dec. 3, 2013 and entitled METHOD FOR MAKING SAFETY TOOTHBRUSHES, now abandoned, which in turn is a continuation-in-part of U.S. patent application Ser. No. 11/653,153 filed on Jan. 12, 2007 and entitled, PACKAGED TOOTHBRUSH AND TOOTHBRUSH CONTAINER AND METHODS OF MAKING SAME, now U.S. Pat. No. 9,066,583; which is further a continuation-in-part of, and claims benefit of the priority date of U.S. patent application Ser. No. 11/563,671, now U.S. Pat. No. 8,448,285 filed on Nov. 27, 2006 and entitled TOOTHBRUSH AND METHODS OF MAKING AND USING SAME, accordingly, the entire contents of these issued patents and patent applications are hereby expressly incorporated by reference.

BACKGROUND OF THE INVENTION

Field of the Invention

The present invention pertains generally to toothbrush devices. More specifically, the invention relates to methods of making a composite head toothbrush head including safety features, with added durability design, particularly useful for prisons, hospitals and patient/elderly care.

Description of the Prior Art

Prisons and other detention systems restrict certain hygiene items used by inmates to prevent the use of an otherwise safe device as a weapon. For example, conventional toothbrushes are not permitted to be used by many prison systems because they may be fashioned into a pointed shaft or rod or otherwise known as a shank, which could be used to endanger other inmates or themselves, as well as security personnel. Psychiatric and other mental health systems likewise require toothbrushes that cannot cause self-injury or harm to care givers or security personnel.

A previous attempt to provide a safe alternative toothbrush for use by inmates was a toothbrush simply having a brush head and a very short handle. However, such handle is so short that it must be grasped by only the thumb and forefinger of the user. Hence, this toothbrush is awkward to use. The fingers of the user may be required to enter the mouth to reach all of the teeth. Such a difficult to use toothbrush may only provide marginal teeth cleaning and be uncomfortable to use. Further ineffectual cleaning procedures may cause, or at the least contribute to, poor dental hygiene, thereby leading to costly dental procedures in some instances.

Toothbrushes having a flexible handle, therefore deterring inmates' ability to fashion into a shank have further been heretofore known. One such example was proposed by inventor Phillips, entitled "Flexible Toothbrush," U.S. Pat. No. 6,295,686. This particular design has a handle portion, reference character sixteen, that is flexible. The handle portion is further coupled to a neck portion, reference character fourteen. The material used in the toothbrush design additionally comprises 50% thermoplastic rubber and 50% polypropylene. As compared to Philips however, the present invention incorporates added design benefits that improve wear characteristics and facilitate use.

Also of concern in the technical field is a bristle retention requirement. Particularly, the bristles must remain secured in place for reasonable longevity. This is of particular concern for prison toothbrushes because bristle retention is very poor when configured to flexible material. Accordingly, present inventor has experimented with composite toothbrush head designs. A related example is provided by Leversby et al., entitled "Toothbrush Structure," U.S. Pat. No. 6,276,020. Leversby and his co-inventors describe a toothbrush design with two materials included in the molding process to generally improve strength of the toothbrush and provide a non-slip surface for grasping. There remains a need, however, for a toothbrush head being resilient for strength and bristle retention but however having an outer softer material.

BRIEF SUMMARY OF THE INVENTION

The present invention specifically addresses and alleviates the above mentioned deficiencies associated with the prior art. More particularly, the present invention in a first aspect is method for making a toothbrush comprising: molding an inner toothbrush head with a first material, the first material being rigid; and molding an outer toothbrush head with a second material at least partially around the inner toothbrush head, the second material being pliable, wherein the outer toothbrush head and inner toothbrush head together form a composite toothbrush head, wherein a method step of molding the inner toothbrush head precedes a method step of molding the outer toothbrush head, wherein the outer toothbrush head having the second pliable material thereby provides a safety toothbrush; providing a toothbrush handle extending from the outer toothbrush head for holding by a user; and attaching a plurality of bristles to the inner toothbrush head providing brushing to the user.

The method in this aspect is additionally characterized in that no glue or adhesive is employed in forming a composite toothbrush. The method does however employ two single cavity molds.

Still further in this aspect the preferred method is characterized wherein the molding an inner toothbrush head provides a pair of pin connectors protruding downwardly further providing for a pair of pin connectors at an interface of the inner toothbrush head and the outer toothbrush head, wherein further the pins are offset diagonally with respect to a longitudinal axis of the flexible handle toothbrush, the pair of pin connector thereby providing an increase in the interface between the inner toothbrush head and the outer toothbrush head.

In a second aspect, the invention may be characterized as a method for making a safety toothbrush comprising: providing a first mold for an inner toothbrush head; selecting a first rigid material for use in the first mold; molding an inner toothbrush head with the first mold; providing a second mold for an outer toothbrush head; molding the outer toothbrush head with a second mold at least partially around a side outer periphery of the inner toothbrush head, the inner and outer toothbrush head together forming a composite toothbrush head; selecting a second pliable material for the second mold, the second pliable material having a softness preventing damage to a patient's teeth or gums due to brushing wherein the molding the outer toothbrush head further comprises molding the second pliable material substantially covering a back of the inner toothbrush head, the pliable material providing safety features to the safety toothbrush; providing a toothbrush handle extending from the outer toothbrush head for holding by a user; and attaching a plurality of bristles to the inner toothbrush head providing brushing to the user.

The method in this aspect is additionally characterized as further comprising the steps of: drilling a multiplicity of bristle holes on a surface of the inner toothbrush head, the drilling precedent to the molding the outer toothbrush head; and filling the multiplicity of bristle holes with steel pins so that during molding the outer toothbrush head, no outer toothbrush head material flows into the bristles holes. Importantly, the method of making a composite head safety toothbrush employs two single cavity molds. Also, the method herein is characterized wherein said molding the inner toothbrush head and said molding the outer toothbrush head allows for a pair of pin connectors at an interface of the inner toothbrush head and the outer toothbrush head, wherein further the pair of pin connectors are offset diagonally with respect to a longitudinal axis of the safety toothbrush, the longitudinal axis further passing equidistant between the pair of pin connectors. Also included in this second aspect is the step of molding a toothbrush handle from the second pliable material thereby providing a flexible handle safety toothbrush.

In still another aspect, the invention is directed to a composite toothbrush comprising: a rigid polymer material comprising a first volume; a pliable flexible material comprising a second volume, wherein the second volume is greater than the first volume. Further, the pliable flexible material provides a softness applicable to safety in a prison environment or an institutional environment.

Also in this aspect, the invention is characterized as comprising an inner toothbrush head at least partially made from the rigid polymer material; and an outer toothbrush head at least partially made from the pliable flexible material. Also, the invention comprises a flexible handle at least partially made from the pliable flexible material; and a pair of pin connectors protruding from the inner toothbrush head, the pin connectors assisting connecting the inner toothbrush head to the outer toothbrush head. Another feature of the invention is that the composite head toothbrush has a flexible handle at least partially made from the $2^{nd}$ material, the pliable material, the toothbrush further thereby being a safety toothbrush. Still further, the flexible handle further includes an enlarged curvilinear flat rear end portion wherein further the toothbrush is able to be flexed into substantially a "L" or "C" shape.

These, as well as other advantages of the present invention will be more apparent from the following description and drawings. It is understood that changes in the specific structure shown and described may be made within the scope of the claims, without departing from the spirit of the invention, such as a variety of positions for pin placement as described herein.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Various inventive features are described below that can each be used independently of one another or in combination with other features.

Figure 1:
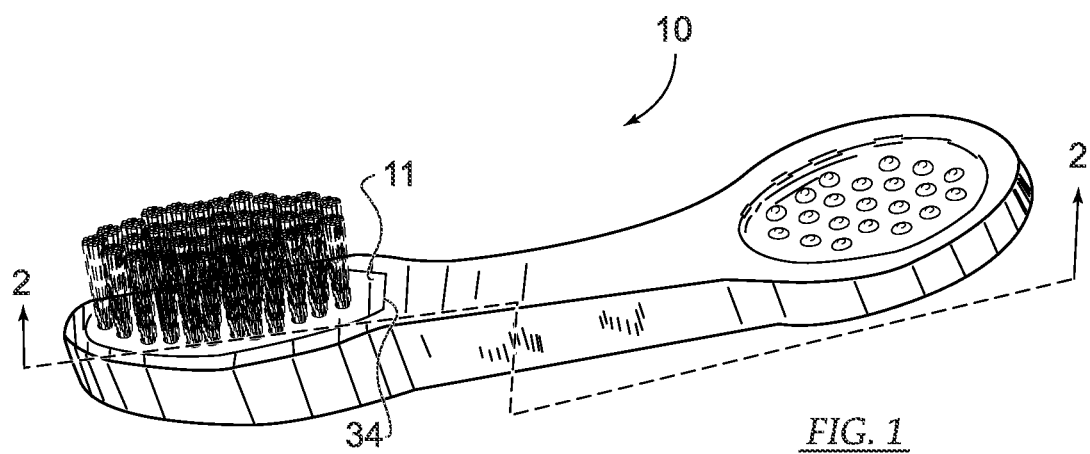
FIG. 1 is a perspective view of toothbrush embodiment made from a preferred method herein.

Initially, with reference to FIG. 1, a flexible handle toothbrush 10 is shown that particularly answers a need in the prison, hospital or institutional applications. As shown, the toothbrush 10 has an inner toothbrush head 11 made with a first material. The first material is ideally comprised of a rigid polymer material, therefore providing structural integrity to the toothbrush 10 head 20 allowing for attachment of bristles 14, via the bristle holes 13, in the manufacturing process. Further, an outer toothbrush head 12 is manufactured from extrudable elastomer material, e.g. thermoplastic material, thereby making this material 12 soft and pliable, hence, safer for prison environments or patient care institutions. Additionally as shown, a handle portion 61 is comprised of the same flexible material as the outer toothbrush head 12.

Figure 2:
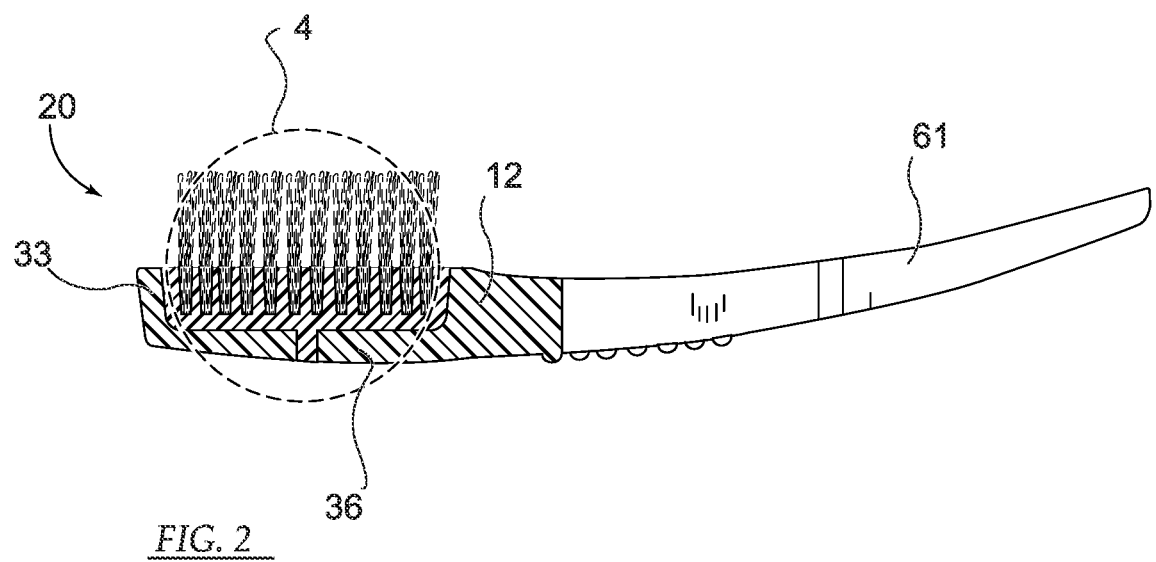
FIG. 2 is a profile view with a partial sectional view thereof taken along line 2-2 in FIG. 1 and in FIG. 3.
Figure 3:
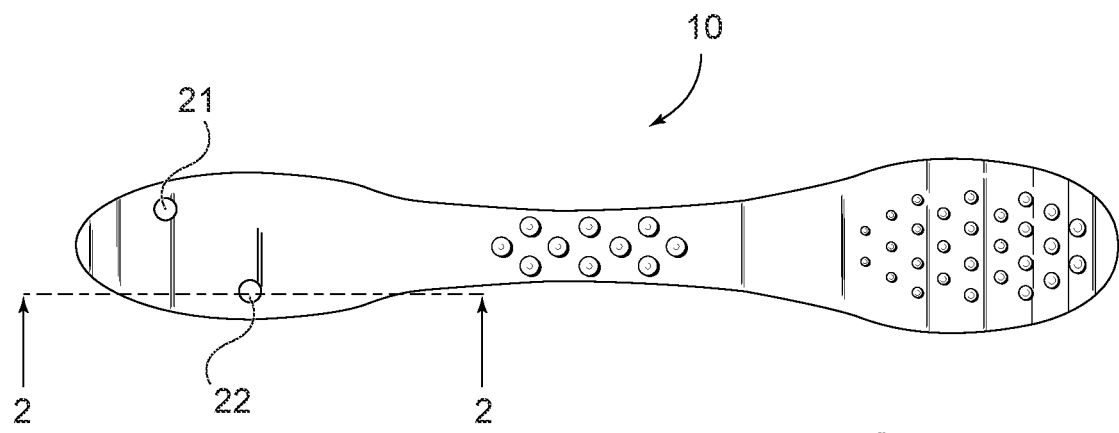
FIG. 3 is a top plan view of the toothbrush embodiment.

With regard to FIG. 2, a profile of the toothbrush 10 is provided with a partial sectional view thereof taken along line 2-2 in FIG. 1 and in FIG. 3. This together with FIG. 4, the composite toothbrush head 20 is shown with inner 11 and outer 12 portions having a pair (or more, or at least one) of pins 21, 22 at the interface thereof. Importantly, two separate single cavity molds are employed and a method step of molding the inner toothbrush head 11 preceding a step of molding the outer toothbrush head 12. In molding the outer toothbrush head 12, the inner toothbrush head 11 is inserted inside the outer toothbrush head 12 (plus handle 61) mold. The outer toothbrush plus handle mold will have a cavity to receive the inner toothbrush head having a plurality of bristle holes drilled thereto. Importantly, the composite toothbrush head 20 is devoid of glue. Rather, a thermoplastic bond is created in the manufacturing process wherein the inner 11 toothbrush head is molded to the outer toothbrush head 12. Further, the manufacturing of the composite head 20 will employ two single cavity molds.

Figure 4:
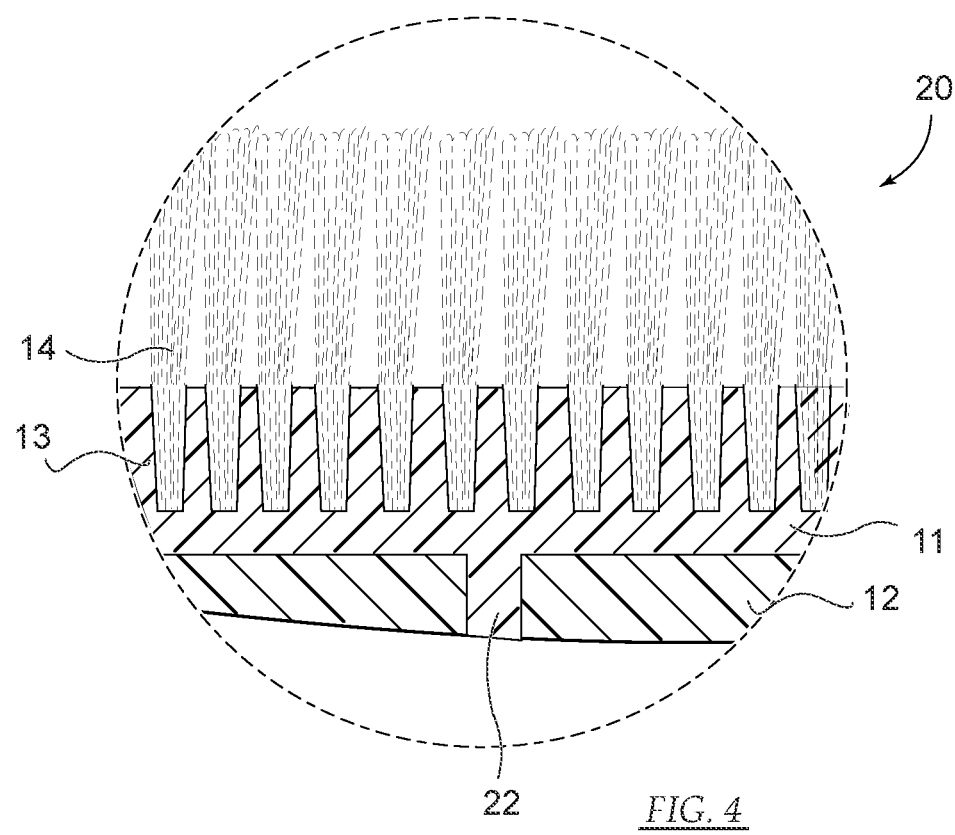
FIG. 4 is an enlarged view of an area circumscribed by line 4 in FIG. 2.

With regard to FIG. 3, a top plan view of the toothbrush is shown particularly illustrating placement of the interfacing pins 21, 22 of the present invention. As stated pin connectors 21, 22 are employed to strengthen the mating between inner 11 and outer 12 toothbrush head. More specifically, the pins 21, 22 are offset diagonally and equidistant with respect to a longitudinal axis of the flexible handle toothbrush 10, as shown. Also, with regard to the pins, they are further employed to maintain the inner head 11 stationary while positioned in the cavity of the outer head (plus handle) mold. Also as contemplated by the present invention, the two or more pins 21, 22 can be positioned anywhere along the interface between inner 11 and outer 12 heads, as long as the inner head stays stationary in the cavity portion of the outer head 12 mold. FIG. 4 provides an enlarged view of the interface between the inner 11 and outer 12 toothbrush heads.

Figures 5, 6:
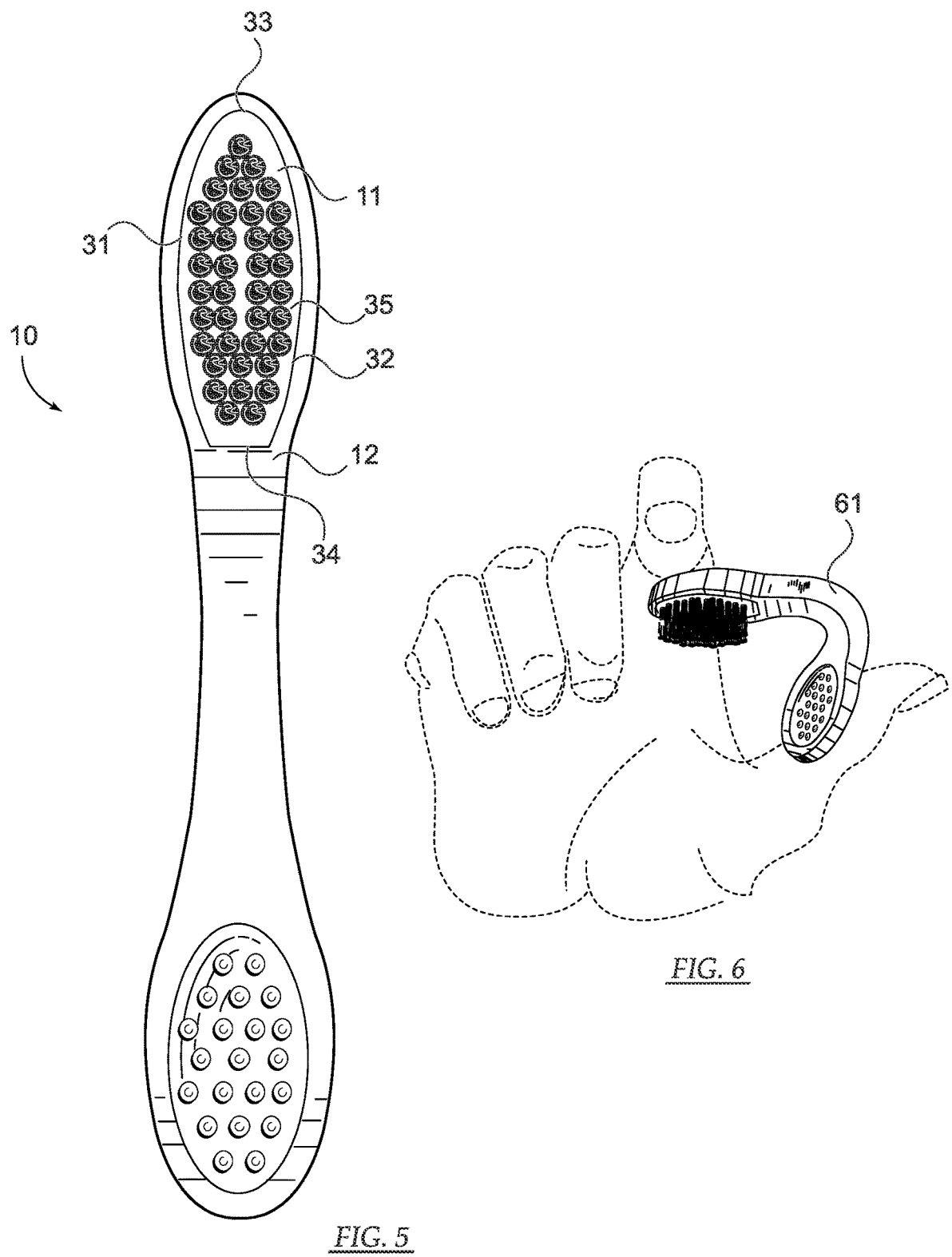
FIG. 5 is a bottom plan view of the toothbrush embodiment.
FIG. 6 is illustrative of a preferred position of a toothbrush illustrating flexing ability.

With regard to FIG. 5, the composite head 11, 12 is shown having a rigid inner core 11 that retains and holds a plurality of toothbrush bristles 14. As detailed herein, the composite head rigid inner core 11 is made from a $1^{st}$ material. Generally, the inner core 11 is partially or wholly surrounded by softer material on various sides 31, 32, 33, 34, 36. Initially, the pliable flexible material surrounds the rigid inner core 11 on a left 31 and a right 32 side in the bottom plan view (FIG. 5) underside aspect; the pliable flexible material is particularly made from a $2^{nd}$ material forming the composite 11, 12. Also notably, the $2^{nd}$ material is cured around the $1^{st}$ material to provide a bond devoid of glue due to thermoplastic properties of the $2^{nd}$ material.

Further with regard to FIG. 5, a tip 33 of the rigid inner core 11 is covered with the pliable flexible material 12. An end 34 that transitions to a neck portion directly behind or adjacent to the end 34 further transitions to the toothbrush handle 61 has pliable flexible material configured thereto. The end 34 of the rigid inner core is opposite the tip 33. The end 34 is distinct from left 31 and right 32 sides.

Yet further with regard to FIG. 5, the invention is unique as compared to previous composite toothbrushes in that the pliable flexible material occupies more of the toothbrush 10 than any hard portion(s) having the rigid polymer material.

With further reference to FIG. 2 and FIG. 3, an opposite side 36 of the rigid inner core 11 is also substantially covered by pliable flexible material 12; in a preferred embodiment (FIG. 3), the opposite side 36 is covered with the exception of the pin connectors 21, 22 being made from the $1^{st}$ material. The opposite side 36 opposes a side 35 having the plurality of bristle holes 13. The pair of pin connectors 21, 22 extend from the opposite side 36 of the toothbrush inner head 11. The toothbrush inner head 11 could further be partially, substantially or wholly encased by the pliable flexible material. A notable exception would be the pin connectors 21, 22 and the side 35 having the plurality of bristles not being fully encased in the pliable flexible material.

With regard to FIG. 6, the preferred toothbrush has a flexible handle 61 at least partially (or wholly) made from the $2^{nd}$ material, the toothbrush thereby being a safety toothbrush suitable for prisons, institutions, or the like. As shown, the toothbrush can easily be bent into a shape of an "L," or a "C." More particularly, the flexible handle 61 has an enlarged curvilinear flat rear end portion and being comprised of flexible material thereby permitting the toothbrush to be flexed into substantially a "L" or "C" shape.

Figure 7:
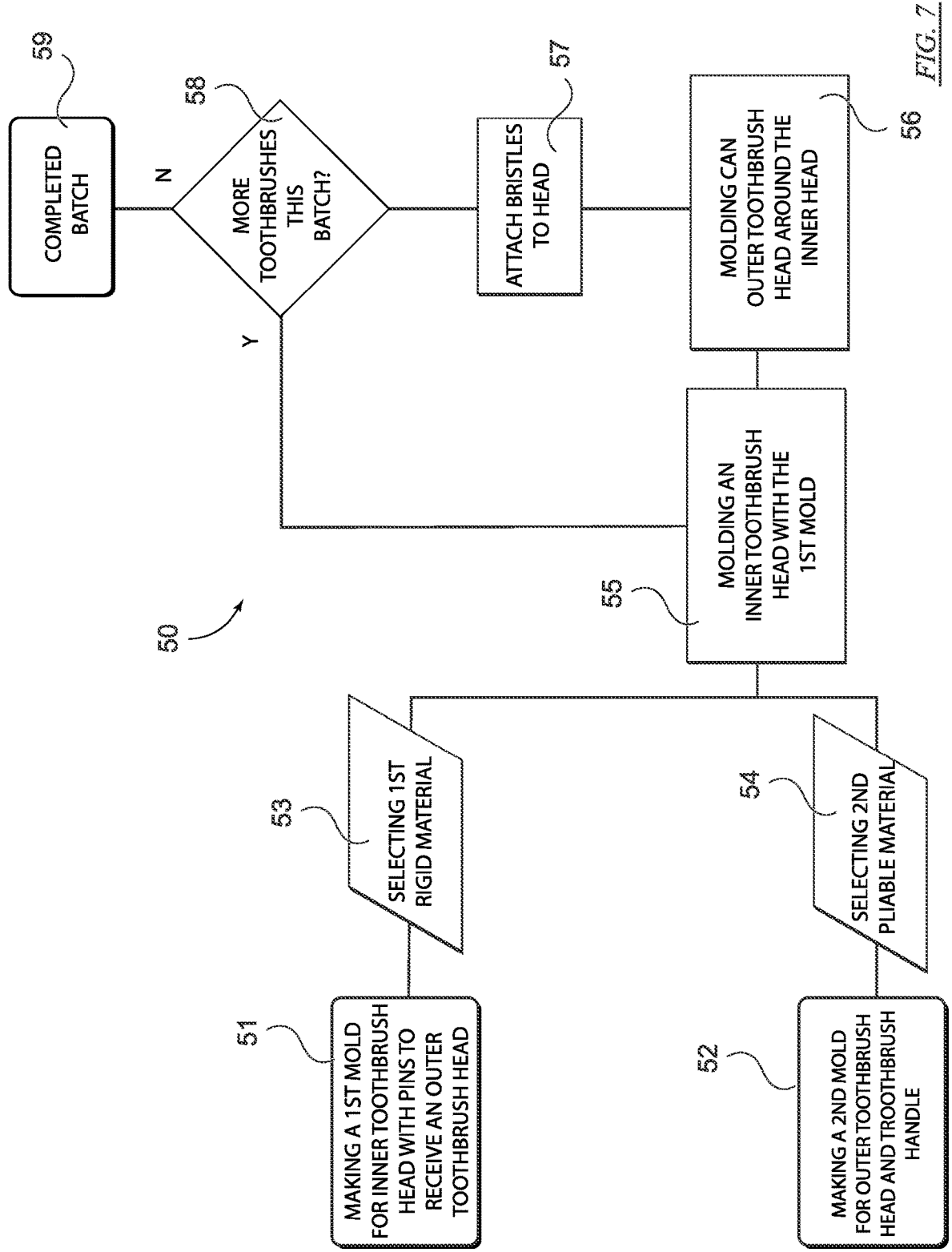
FIG. 7 is a functional block diagram of a preferred method as detailed herein.

With regard to FIG. 7, a functional block diagram illustrating a method 50 of making flexible handle toothbrushes is illustrated. Initially a first mold is made 51 for the inner toothbrush head 11. Next, a first rigid material is selected 53 for use in the first mold and a second mold for the outer toothbrush head is made 52. A second pliable material 54 is then selected for the outer toothbrush head 12, providing a softness preventing damage to a patient's teeth or gums due to brushing and to prevent fashioning into a weapon. Optionally, color is added to a hopper containing the second pliable material 12.

As stated, the method step of molding the inner toothbrush head 55 precedes the step of molding the outer toothbrush head 56. More specifically, the completed toothbrush inner head 11 may be placed in the cavity of the second mold 56. Also importantly, the second material 12 is cured around the first material 11 to provide a bond devoid of glue due to its thermoplastic properties. In a preferred embodiment, the second mold 56 includes the outer head 12 and a handle 61, both made from the pliable flexible material. Or optionally, the handle 61 could also be a composite of soft 12 and hard material 11. The final step in the method herein is to insert 57 bristles 14 to the toothbrush head and determine batch size 58, 59.

Also with regard to FIG. 7, the preferred method herein generally provides for making or molding 55 an inner toothbrush head 11 as an initial method step. Subsequently, the outer toothbrush head 12 is molded 56 to the inner toothbrush head at least partially around an outer periphery sufficiently so that the outer toothbrush head 12 is able to retain and hold the inner toothbrush head 11. At this point, the composite toothbrush 10 of the present invention has been successfully achieved including both rigid and soft pliable material. Subsequent to this or simultaneously, a toothbrush handle 61 is molded with the soft pliable material or alternatively with a mixture of rigid and soft material with additional (or same) moldings.

Additionally, a preferred method includes the steps of: drilling a multiplicity of bristle holes on a surface of the inner toothbrush head 11, as best seen and FIG. 4. The drilling is subsequent to the making 55 the inner toothbrush head. Further included is a method step of filling the multiplicity of bristle holes 13 with steel pins so that during the method step of molding an outer toothbrush head 56, no outer toothbrush head material 54 flows into the bristles holes.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular Method of Making Composite Head Safety Toothbrush as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A method for making a toothbrush comprising:
   molding an inner toothbrush head with a first material, the first material being rigid; and
   molding an outer toothbrush head with a second material at least partially around the inner toothbrush head, the second material being pliable, wherein the outer toothbrush head and inner toothbrush head together form a composite toothbrush head, wherein a method step of molding the inner toothbrush head precedes a method step of molding the outer toothbrush head, wherein the outer toothbrush head having the second pliable material thereby provides a safety toothbrush;
   molding a toothbrush handle with the second material extending from the outer toothbrush head for holding by a user, the toothbrush handle thereby being pliable and flexible; and
   attaching a plurality of bristles to the inner toothbrush head providing brushing to the user.

2. The method for making a toothbrush of claim 1, wherein the toothbrush is a composite head toothbrush devoid of glue or other adhesives.

3. The method for making a toothbrush of claim 1, wherein the method employs two single cavity molds.

4. The method for making a toothbrush of claim 1, wherein the molding an inner toothbrush head provides a pair of pin connectors protruding downwardly further providing for the pair of pin connectors at an interface of the inner toothbrush head and the outer toothbrush head, wherein further the pin connectors are offset diagonally with respect to a longitudinal axis of the flexible handle toothbrush, the pair of pin connectors thereby providing an increase in the interface between the inner toothbrush head and the outer toothbrush head.

5. A method for making a safety toothbrush comprising:
   providing a first mold for an inner toothbrush head;
   selecting a first rigid material for use in the first mold;
   molding an inner toothbrush head with the first mold;
   providing a second mold for an outer toothbrush head;
   molding the outer toothbrush head with a second mold wholly around a side outer periphery of the inner toothbrush head, the inner and outer toothbrush head together forming a composite toothbrush head;
   selecting a second pliable material for the second mold, the second pliable material having a softness preventing damage to a patient's teeth or gums due to brushing wherein the molding the outer toothbrush head further comprises molding the second pliable material substantially covering a back of the inner toothbrush head, the pliable material providing safety features to the safety toothbrush;
   providing a toothbrush handle extending from the outer toothbrush head for holding by a user; and
   attaching a plurality of bristles to the inner toothbrush head providing brushing to the user.

6. The method for making the safety toothbrush of claim 5 further comprising curing the second material around the first material thereby bonding same without using glue.

7. The method for making the safety toothbrush of claim 5, further comprising:
   drilling a multiplicity of bristle holes on a surface of the inner toothbrush head, the drilling precedent to the molding the outer toothbrush head; and
   filling the multiplicity of bristle holes with steel pins so that during molding the outer toothbrush head, no outer toothbrush head material flows into the bristles holes.

8. The method for making the safety toothbrush of claim 5, wherein said molding the inner toothbrush head precedes said molding the outer toothbrush head.

9. The method for making the safety toothbrush of claim 5, further comprising employing two single cavity molds.

10. The method for making the safety toothbrush of claim 5, wherein said molding the inner toothbrush head and said molding the outer toothbrush head allowing for a pair of pin connectors at an interface of the inner toothbrush head and the outer toothbrush head, wherein further the pair of pin connectors are offset diagonally with respect to a longitudinal axis of the safety toothbrush, the longitudinal axis further passing equidistant between the pair of pin connectors.

11. The method for making the safety toothbrush of claim 5, further comprising molding a toothbrush handle from the second pliable material thereby providing a flexible handle safety toothbrush.

12. A method for making a safety toothbrush comprising:
   providing a first mold for an inner toothbrush head;
   selecting a first rigid material for use in the first mold;
   molding an inner toothbrush head with the first mold;
   providing a second mold for an outer toothbrush head together with a toothbrush handle;
   selecting a second pliable material for the second mold, the second pliable material having a softness preventing damage to a patient's teeth or gums due to brushing and preventing fashioning the toothbrush handle into a weapon;
   inserting the inner toothbrush head into the second mold and further molding the outer toothbrush head with the second mold wholly around a side outer periphery of the inner toothbrush head and further molding the toothbrush handle with the second mold, the inner and outer toothbrush head together forming a composite toothbrush head; and
   attaching a plurality of bristles to the inner toothbrush head providing brushing to the user.

13. The method of making a safety toothbrush of claim 12 wherein the molding the outer toothbrush head further comprises molding the second pliable material substantially covering a back of the inner toothbrush head, the pliable material additional providing safety features to the safety toothbrush.

14. The method for making the safety toothbrush of claim 12 further comprising curing the second material around the first material thereby bonding same without using glue.

15. The method for making the safety toothbrush of claim 12, further comprising:
   drilling a multiplicity of bristle holes on a surface of the inner toothbrush head, the drilling precedent to the molding the outer toothbrush head; and
   filling the multiplicity of bristle holes with steel pins so that during molding the outer toothbrush head, no outer toothbrush head material flows into the bristles holes.

* * * * *